$k = 2$ $$A \oplus B = A \cdot \overline{B} + \overline{A} \cdot B$$

FIG. 7

| MODULE INPUTS $k$ | 2 | | 3 | | 4 | | 5 | | 6 | | 7 | | 8 | | 9 | |
|---|---|---|---|---|---|---|---|---|---|---|---|---|---|---|---|---|
| NUMBER OF NAND GATES $G_k$ AND LOGIC LEVELS $L_k$ IN THE PARITY TREE / NUMBER OF TOTAL PARITY TREE INPUTS $\underline{n}$. | $G_2$ | $L_2$ | $G_3$ | $L_3$ | $G_4$ | $L_4$ | $G_5$ | $L_5$ | $G_6$ | $L_6$ | $G_7$ | $L_7$ | $G_8$ | $L_8$ | $G_9$ | $L_9$ |
| 2 | **4** | **3** | | | | | | | | | | | | | | |
| 3 | **8** | **6** | **7** | **4** | | | | | | | | | | | | |
| 4 | **12** | **6** | 14 | 8 | 11 | **4** | | | | | | | | | | |
| 5 | **16** | **9** | 14 | 8 | 22 | 8 | **16** | **5** | | | | | | | | |
| 6 | **20** | **9** | 21 | 8 | 22 | 8 | 32 | 10 | **22** | **5** | | | | | | |
| 7 | **24** | **9** | 21 | 8 | 22 | 8 | 32 | 10 | 44 | 10 | **29** | **5** | | | | |
| 8 | **28** | **9** | 28 | 8 | 33 | 8 | 32 | 10 | 44 | 10 | 58 | 10 | **37** | **5** | | |
| 9 | **32** | **12** | 28 | 8 | 33 | 8 | 32 | 10 | 44 | 10 | 58 | 10 | 74 | 10 | **46** | **6** |
| 10 | **36** | **12** | 35 | 12 | 33 | 8 | 48 | 10 | 44 | 10 | 58 | 10 | 74 | 10 | 92 | 12 |
| 11 | **40** | **12** | 35 | 12 | 44 | 8 | 48 | 10 | 44 | 10 | 58 | 10 | 74 | 10 | 92 | 12 |
| 12 | **44** | **12** | 42 | 12 | 44 | 8 | 48 | 10 | 66 | 10 | 58 | 10 | 74 | 10 | 92 | 12 |
| 13 | **48** | **12** | 42 | 12 | 44 | 8 | 48 | 10 | 66 | 10 | 58 | 10 | 74 | 10 | 92 | 12 |
| 14 | **52** | **12** | 49 | 12 | 55 | 8 | 64 | 10 | 66 | 10 | 87 | 10 | 74 | 10 | 92 | 12 |
| 15 | **56** | **12** | 49 | 12 | 55 | 8 | 64 | 10 | 66 | 10 | 87 | 10 | 74 | 10 | 92 | 12 |
| 16 | **60** | **12** | 56 | 12 | 55 | 8 | 64 | 10 | 66 | 10 | 87 | 10 | 111 | 10 | 92 | 12 |
| 17 | **64** | **15** | 56 | 12 | 66 | 12 | 64 | 10 | 88 | 10 | 87 | 10 | 111 | 10 | 92 | 12 |
| 18 | **68** | **15** | 63 | 12 | 66 | 12 | 80 | 10 | 88 | 10 | 87 | 10 | 111 | 10 | 138 | 12 |
| 19 | **72** | **15** | 63 | 12 | 66 | 12 | 80 | 10 | 88 | 10 | 87 | 10 | 111 | 10 | 138 | 12 |
| 20 | **76** | **15** | 70 | 12 | 77 | 12 | 80 | 10 | 88 | 10 | 116 | 10 | 111 | 10 | 138 | 12 |

United States Patent Office 3,718,904

Patented Feb. 27, 1973

3,718,904

NAND GATE REALIZATION OF THE N-INPUT PARITY FUNCTION

Andrew Frederick Bulfer, Oceanport, and Enn Tammaru, Matawan, N.J., assignors to Bell Telephone Laboratories, Incorporated, Murray Hill and Berkeley Heights, N.J.

Filed Sept. 1, 1971, Ser. No. 176,819
Int. Cl. G06f *11/10*
U.S. Cl. 340—146.1 AG 10 Claims

ABSTRACT OF THE DISCLOSURE

A generalized, recursive, design procedure is taught for synthesizing a parity checking circuit comprised solely of NAND gates and having any arbitrary, integral number *k*, greater than three, of parallel, binary inputs. Increased operating speed is achieved by interconnecting plural logic levels together through a level of interactive NAND gate logic to reduce the number of logic levels which are normally required to implement such a circuit.

BACKGROUND OF THE INVENTION

Field of the invention

The invention relates to the field of digital error detecting systems, and more particularly to the design of high-speed, parity checking circuits.

Prior art

Parity checking circuits have been traditionally realized in either of two particular forms of logic circuits. One form is the classical sum-of-products circuit comprising a plurality of AND, OR and NOT logic gates, or alternatively NAND logic gates, organized into three or more levels of logic. The other form of parity checking circuit is the conventional n-input parity tree comprising a plurality of 2-input or 3-input, Exclusive-OR, logic modules, which may be comprised of NAND gates. Such a parity tree is organized into $3([\log_2(n-1)]+1)$ levels of NAND gate logic, where the brackets connote the integral value of the quantity enclosed therein. The use of NAND gates to implement both circuit forms has become increasingly prevalent in recent years for two basic reasons. One, an increase in reliability and economy normally results from the use of but a single type of basic logic gate; and two, the use of semiconductor and integrated circuit logic enables the AND and NOT logic functions to be readily implemented in a single NAND gate logic package.

More recently parity checking functions with a large number of primary input variables have been realized almost exclusively in the parity tree form of parity checking circuit. The most important reason for this is that a parity tree requires substantially fewer logic gates to implement and is, consequently, far more economical than a corresponding sum-of-products circuits. Another reason is that a parity tree is relatively easier to design and construct than a sum-of-products circuit. Still another reason is that the fan-in problem becomes acute in a sum-of-products circuit when it is used to realize a relatively large parity function.

The fan-in problem results in an unavoidable increase in the number of logic levels and the cost of the individual logic gates required to implement a sum-of-products circuit. Furthermore, in practical applications of these circuits, the required logic gates with a high fan-in are often commercially unavailable. The number of logic levels is a good measure of the operating speed of a logic circuit. As a result, a sum-of-products implementation of a parity checking circuit is often too costly and operates too slowly in an environment of high-speed, digital, data processing equipment to provide the degree of error checking capacity normally required by such equipment.

The parity tree form of parity checking circuit also suffers from the same problem of requiring too many levels of logic to offer and advantages in operating speed over the sum-of-products form of parity checking circuit. In fact, in most instances a parity tree operates at an even slower speed than an equivalent sum-of-products circuit. Consequently, parity trees using the prior art, 2-input, or 3-input Exclusive-OR modules, while being far more economical than equivalent sum-of-products circuits, also operate too slowly to satisfy an ever increasing need for a faster parity checking circuit which is also economical.

The reason for the relatively slow operating speeds of the prior art parity trees is primarily because increasing the number of primary inputs to prior art, Exclusive-OR modules has usually resulted in an undesirable increase in the total number of logic levels required to implement a parity tree comprised of the modules.

Accordingly, it is an object of this invention to produce a new economical form of parity checking circuit which has fewer levels of logic than prior art, all-NAND-gate, parity tree circuits having an equivalent number of primary binary inputs.

It is another object to make use of interactive logic at plural logic levels within a plurality of prior art, Exclusive-OR modules to interconnect the modules into a new and faster form of parity checking circuit.

It is yet another object of the invention to develop a generalized, systematic, algorithmic procedure for synthesizing an all-NAND gate parity checking circuit which has any arbitrary number of parallel, primary, binary inputs and which makes use of interactive logic at plural logic levels to reduce the total number of logic levels which would normally be required to implement such a circuit.

BRIEF SUMMARY OF THE INVENTION

One aspect of the invention is an all-NAND-gate, parallel input, combinatorial, parity checking circuit with an arbitrary integral number *k*, greater than three, of primary binary inputs. The circuit utilizes one level of interactive NAND gate logic for interconnecting a plurality of prior art, all-NAND-gate, 2-input, Exclusive-OR, parity checking circuits. The level of interactive logic provides NAND functions of otherwise uncombined pairs of primary inputs with outputs of NAND gates in the lower levels of logic of the 2-input circuits. The outputs of the NAND gates in the level of interactive logic are in turn used to control the inputs to higher levels of logic in the resultant circuit. A reduction from the number of logic levels normally required to implement a large, *k*-input, parity tree with the Exclusive-OR modules is achieved through the use of the additional level of interactive NAND gate logic to coincidentaly combine different combinations of primary, binary inputs with the outputs of NAND gates in other levels of logic within the circuit. In addition, the circuit is advantageous in the respect that it does not require complimented primary inputs.

Another aspect of the invention is a generalized, synthesis procedure in the form of a recursive algorithm for systematically interconnecting in an orderly manner a plurality of prior art, 2-input, all-NAND-gate, Exclusive-OR, parity checking circuits to design any particular one of a whole family of parity checking circuits realizable in accordance with the first aspect of the invention.

It is a feature of the invention that a whole family of parity checking circuits is provided which has, generally, *k* inputs and which makes use of interactive logic at plural logic levels to combine a plurality of prior art forms of parity checking circuits into a new and faster form of parity checking circuit.

It is a further feature that an all-NAND-gate, $k$-input, parity checking circuit is realized which comprises but $[\log_2(k\text{-}1)]+3$ levels of logic, where the brackets connote the integral value of the quantity enclosed therein.

It is another feature that a simple, generalized, design procedure in the form of recursive synthesis and reduction algorithms is introduced for realizing any particular one of such a family of $k$-input, parity checking circuits.

BRIEF DESCRIPTION OF THE DRAWINGS

FIG. 7 depicts a table illustrating the numbers of logic gates and logic levels required to implement an $n$-input parity tree with $k$-input parity checking circuits, for various values of $k$ and $n$.

DETAILED DESCRIPTION OF THE INVENTION

Figure 1:
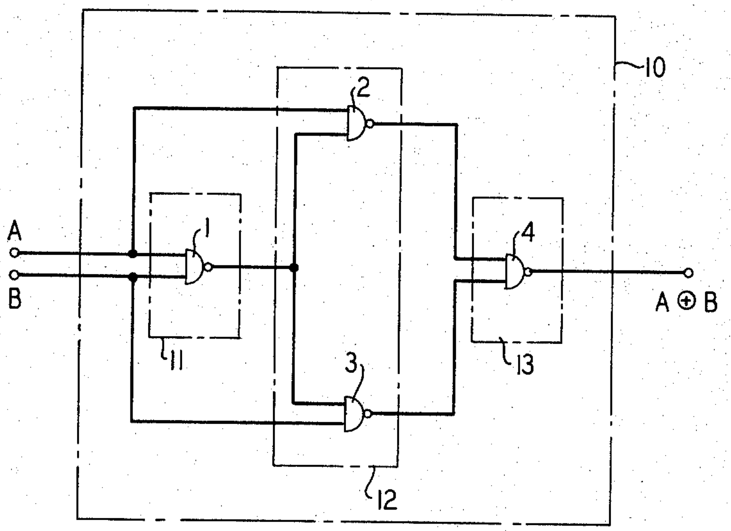
FIG. 1 PRIOR ART
FIG. 1 shows the basic prior art, 2-input, parity checking circuit configured in the embodiment necessary to be amenable to application of the design procedure taught in the disclosure of the invention.

The design procedure for obtaining a combinatorial, parity checking circuit having any arbitrary integral number $k$, greater than two, of parallel, primary, binary inputs is formulated to operate on the particular prior art embodiment 10 of 2-input, EXCLUSIVE-OR, parity checking circuit which is shown in FIG. 1. This embodiment and other, similar embodiments of the EXCLUSIVE-OR circuit are commonly used as an individual element or module in the conventional parity tree form of parity checking circuit.

The basic 2-input circuit 10 comprises four NAND gates of any suitable type which operates on the well-known principles of Boolean logic. These four NAND gates are interconnected into three logic levels 11, 12 and 13. Level 11 comprises a single NAND gate 1 into which a pair of primary binary inputs, represented as A and B, are coupled. Level 12 of logic comprises a pair of NAND gates 2 and 3. The output of gate 1 connects to one input to gate 2 and primary input A connects to a second input to gate 2. The output of gate 1 also connects to one input to gate 3, and primary input B connects to another input to gate 3. Level 13 of logic comprises a single NAND gate 4 having a pair of inputs, one of which connects to the output of gate 2 and the other of which connects to the output of gate 3.

Figure 2:
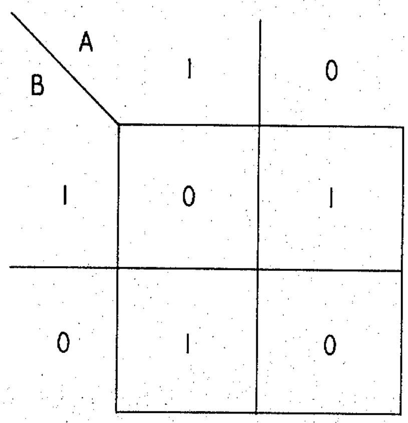
FIG. 2 PRIOR ART
FIG. 2 illustrates a truth table for the Exclusive-OR, parity checking function provided by the circuit depicted in FIG. 1.

As a result, a logic signal is produced at the output of gate 4 which is indicative of an Exclusive-OR functional relationship between primary inputs A and B. This functional relationship is illustrated in FIG. 2 in the form of a truth table.

The design procedure for obtaining a $k$-bit parity checking circuit includes two basic procedures. One basic procedure is a generalized, recursive, synthesis procedure which is iteratively reapplied a number of times to progressively combine a plurality of the basic 2-input circuits into a parity checking circuit having any power of two, greater than one, of parallel, primary inputs. This power of two is represented by the quantity $2^r$, where $r$ is an integral index number. The second basic procedure is a generalized reduction procedure for reducing a circuit designed according to the synthesis procedure to have an arbitrary number $k$ of inputs, which is not a power of two.

Application of the synthesis procedure to a pair of the basic 2-input circuits yields a 4-input circuit. Reapplication of the synthesis procedure to a pair of the 4-input circuits yields an 8-input circuit. Again, reapplying the synthesis procedure to a pair of the 8-input circuits yields a 16-input circuit; and so on, until a parity checking circuit is designed which has any desired number that is a power of two of parallel, binary inputs.

The recursive synthesis procedure for obtaining a $2^r$-input parity checking circuit by combining a pair of $2^{r-1}$-input parity checking circuits, where $r$ is an integral number greater than two, comprises the following steps:

(1) Add a NAND gate for each possible pair of otherwise unused primary input combinations not already connecting to a NAND gate in either of the $2^{r-1}$-input circuits. There will be $(2^{r-1})^2$ newly added NAND gates.

(2) Connect each of the otherwise unused pairs of primary input combinations to the inputs of a different one of the newly added NAND gates.

(3) Connect the outputs of each of the newly added NAND gates to those gates which are located in the level $r$ of logic in the $2^{r-1}$-input circuits and which have a common direct primary input. The level $r$ of logic in each of the $2^{r-1}$-input circuits is measured from the input level of logic, the NAND gates of which receive only direct primary inputs.

(4) Connect the output of each gate in the first $(r-1)$ levels of logic in the $2^{r-1}$-input circuits to an input in each of the newly added NAND gates which has a common direct primary input.

(5) Eliminate the logic gate at the level $(r+1)$ of logic in each of the $2^{r-1}$-input circuits. There will necessarily be only one such gate in each circuit. Replace the two eliminated logic gates with a new NAND gate having a fan-in of at least $2^r$, and connect the outputs of the gates in the level $r$ of logic in both circuits to the inputs of the new NAND gate.

The resulting circuit is the desired parallel, $2^r$-input, all-NAND-gate, parity checking circuit. As is apparent from the synthesis procedure, one additional level of logic is added each time the procedure is applied to effectively double the number of parallel inputs.

As indicated before, the second basic procedure is a generalized reduction procedure for reducing a $2^r$-input circuit, designed according to the synthesis procedure described above, to have an arbitrary number $k$ of inputs, where $k$ is an integral number greater than $2^{r-1}$ and less than $2^r$. The reduction procedure is as follows:

(1) Synthesize a $2^r$-input parity checking circuit according to the basic synthesis procedure described above, where $2^r$ is the smallest power of two greater than $k$.

(2) Assign $(2^r-k)$ selected ones of the primary inputs of the $2^r$-input circuit to be logical "zeroes." It is desirable that these $(2^r-k)$ primary inputs comprise the fewest number possible of pairs of primary inputs which feed into NAND gates in the input level of logic of the $2^r$-input circuit.

(3) According to the well-known rules of Boolean logic, retain only those logic gates (and leads corresponding thereto) in the circuit whose outputs may attain a logic state other than a logical "one" for all possible combinations of primary inputs.

The result is the desired parallel, $k$-input, all-NAND-gate, parity checking circuit.

In general, a $2^r$-input parity checking circuit, designed according to the recursive synthesis procedure is obtained by applying the procedure $$(r-1) \qquad \text{(a)}$$

times, where $r$ is a positive integer greater than one. A $k$-input circuit may be obtained from a $2^r$-input circuit, where $$2^{r-1}<k<2^r \qquad (b)$$

by applying the reduction procedure to the $2^r$-input circuit. Implementing a $k$-input circuit requires $$\frac{k(k+1)}{2}+1 \qquad (c)$$

NAND gates interactively combined into $$[\log_2(k-1)]+3 \qquad (d)$$

logic levels, where the brackets again represent the integral part of the quantity enclosed therein. The maximum fan-in requirement on any NAND gate is a fan-in of $$k \qquad (e)$$

inputs, which usually occurs at the output NAND gate. The maximum fan-out requirement on any NAND gate is a fan-out of $$2(k-1) \qquad (f)$$

outputs, which usually occurs at the NAND gates of the input level of logic that accept only direct primary inputs. The quantity $2^r$ is substituted for $k$ in the above Formulae c–f in order to determine the gate requirements, logic level requirements, and fan-in and fan-out requirements in cases where $k=2^r$.

Figure 3:
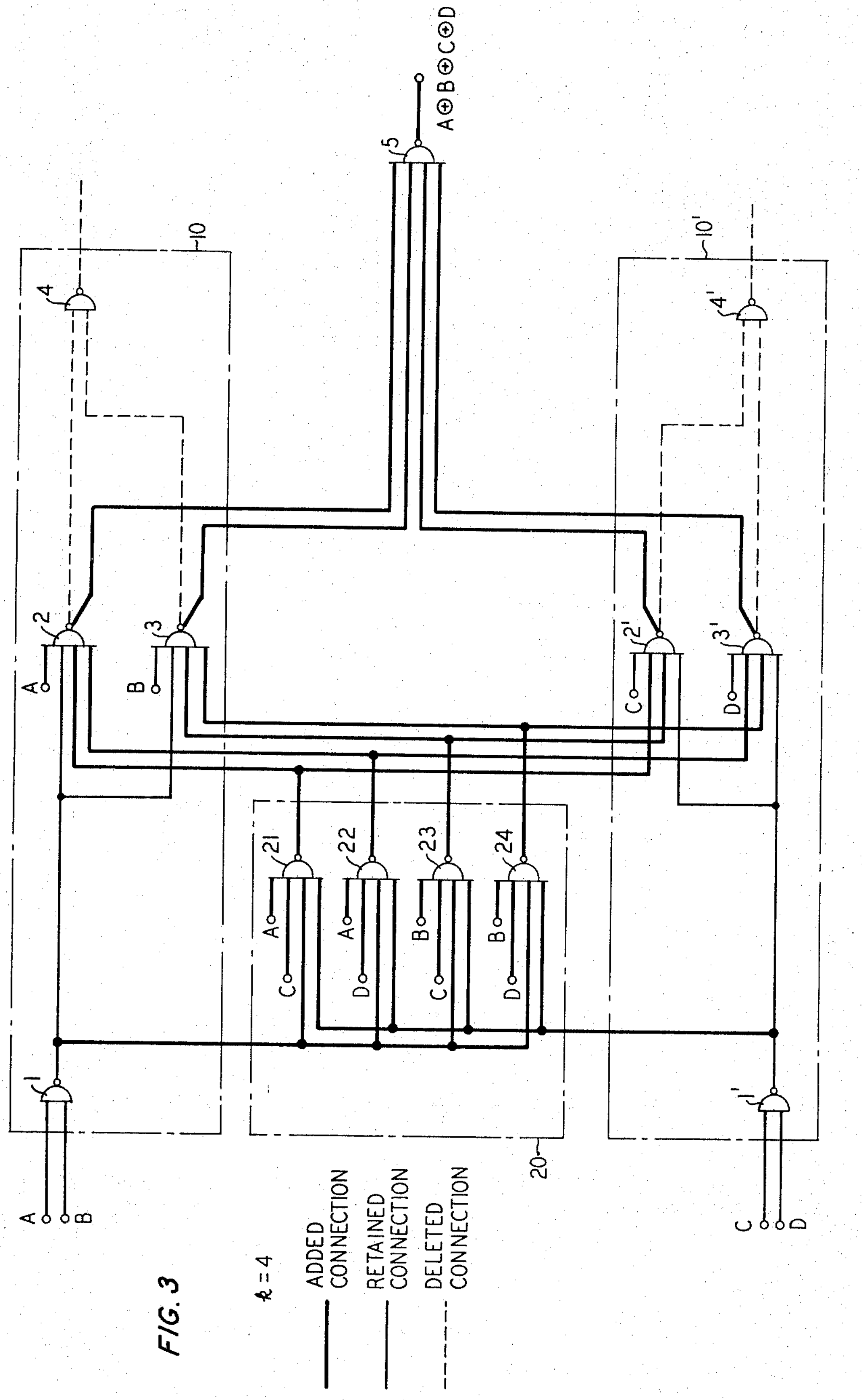
FIG. 3 shows a new 4-input, parity checking circuit obtained according to the above-mentioned recursive, synthesis procedure.

An example of a $k$-input circuit, designed according to the recursive synthesis procedure, is shown in FIG. 3. The figure depicts a parity checking circuit having four primary binary inputs A, B, C and D and comprising a pair of the basic 2-input circuits 10 and 10'. In addition, the 4-input circuit includes group 20 of interactive NAND gate logic for cross-coupling circuits 10 and 10' at plural logic levels. Group 20 comprises four NAND gates 21, 22, 23 and 24 into which input pair combinations A and C, A and D, B and C, and B and D are respectively coupled. NAND gate 5 with a fan-in of four has also been included to replace NAND gates 4 and 4'. This is necessary because NAND gates 4 and 4' are only required to have a fan-in of two in each of circuits 10 and 10', respectively.

As is apparent from the above description, $r=2$ for a 4-input circuit. Therefore, the 4-input circuit is realized by applying the synthesis procedure one time (Formula a) to combine a pair of the basic 2-input circuits. The 4-input circuit has eleven NAND gates, (Formula c) interactively combined into four levels of NAND gate logic (Formula d). The maximum fan-in requirement is 4-inputs (Formula e) occurring at gate 5, and the maximum fan-out requirement is 6-inputs (Formula f) occurring at gates 1 and 1'.

Figure 4:
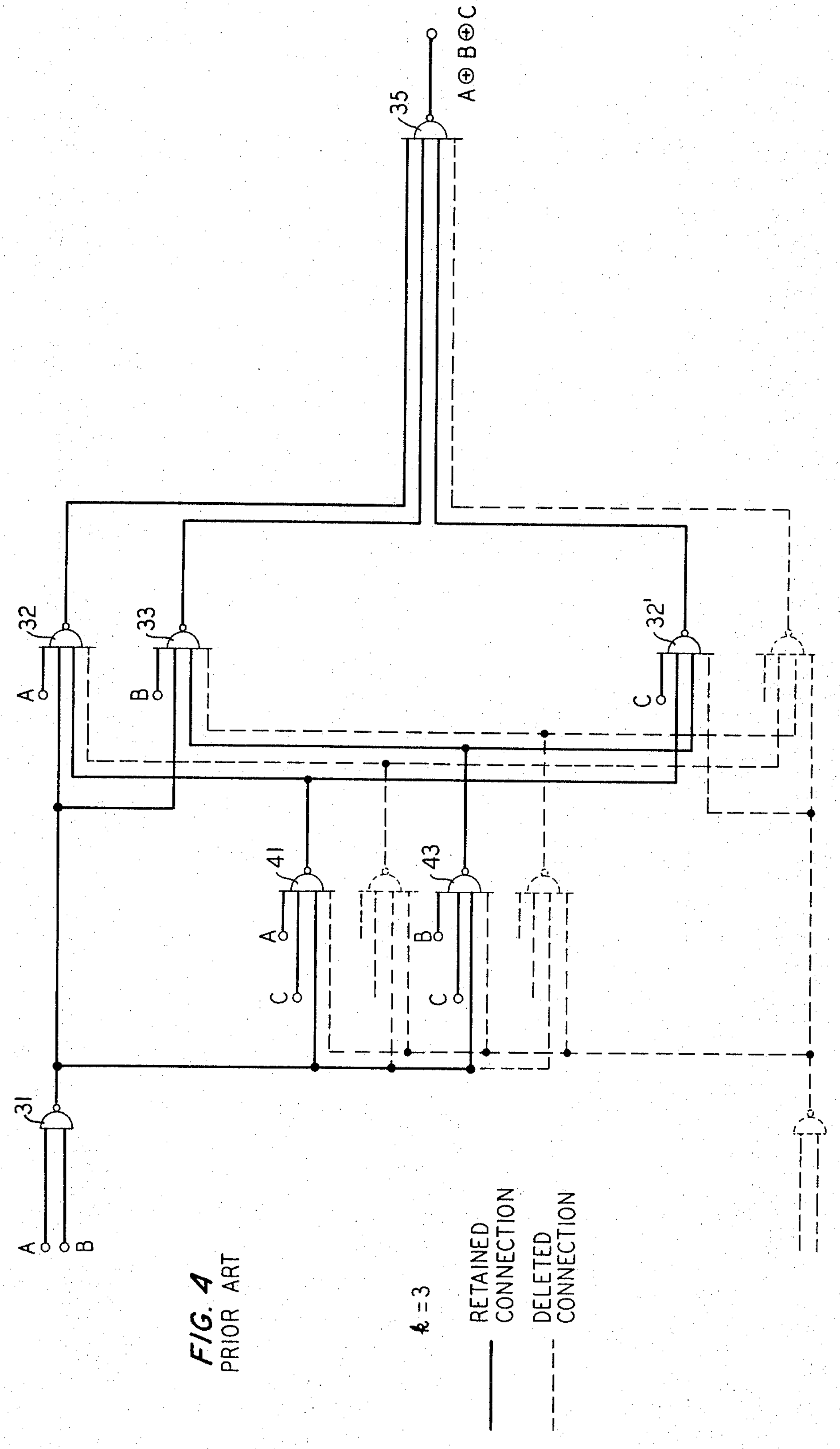
FIG. 4 PRIOR ART
FIG. 4 depicts a prior art, 3-input, parity checking circuit obtained from a 4-input circuit according to the above-mentioned reduction procedure.

FIG. 4 illustrates a 3-input parity checking circuit which can be derived according to the reduction procedure from the 4-input circuit shown in FIG. 3. The 3-input circuit has been found in the prior art, but it does not appear to have been designed according to the synthesis and reduction procedures taught above.

It is apparent from FIG. 4 that the 3-input circuit results by deleting NAND gates 22, 24, 1' and 3' from the 4-input circuit according to the reduction procedure. It is also apparent from FIG. 3 and Formulae e and f that the remaining NAND gates have reduced fan-in or fan-out requirements. Accordingly, the remaining gates have been changed in FIG. 4 to reflect these differences.

Figure 5:
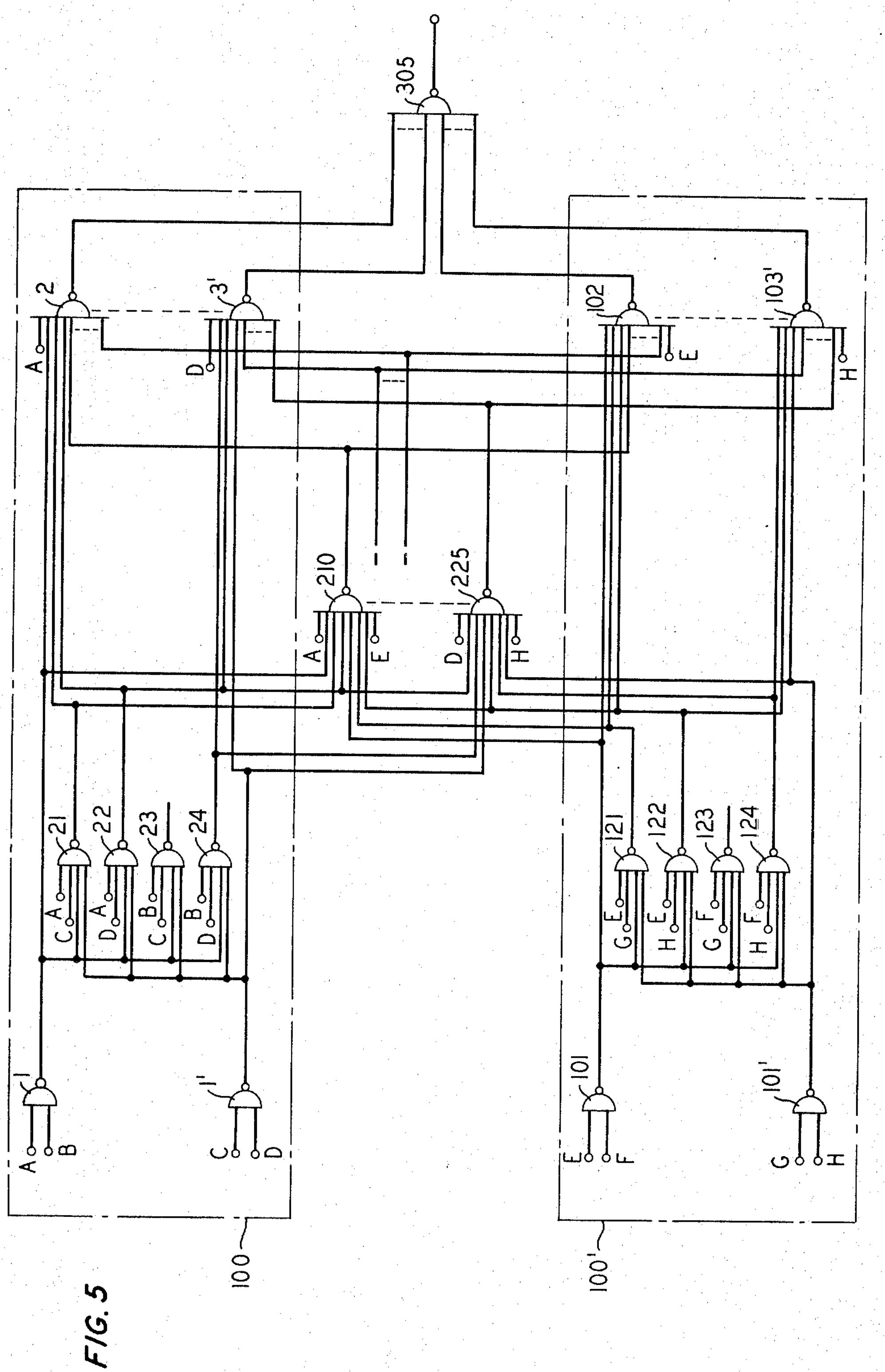
FIG. 5 illustrates a new 8-input, parity checking circuit obtained according to the synthesis procedure.

An example of an 8-input circuit ($r=3$) is schematically shown in abbreviated form in FIG. 5. As is apparent from the figure, the complexity itself of the 8-input circuit, particularly points out the utility of the synthesis procedure for synthesizing large $k$-input circuits.

It is further apparent from FIG. 5 that the 8-input circuit comprises a pair of 4-input circuits 100 and 100'. Circuit 100 includes NAND gates 1, 1', 21–24, 2 and 3'. Circuit 100 includes NAND gates 101, 101', 121–124, 102, and 103'. In addition, the 8-input circuit includes additional NAND gates 210–225 for interactively coupling circuits 100 and 100' at plural logic levels therein. NAND gate 305 is included as a replacement for output NAND gates which are normally used in the 4-input circuits to perform NAND functions on the outputs of gates 2, 3, 2' and 3' and 102, 103, 102' and 103' in circuits 100 and 100', respectively.

It is also apparent from FIG. 5 and from the Formula a that the 8-input circuit is synthesized by applying the synthesis procedure twice. It is further apparent from Formulae a–f that the 8-input circuit has thirty-seven NAND gates interconnected into five levels of logic. Output NAND gates 305 has the largest fan-in requirement in the circuit with a fan-in of eight and gates 1, 1', 101 and 101' have the largest fan-out requirements with a fan-out of fourteen for each gate.

Figure 6:
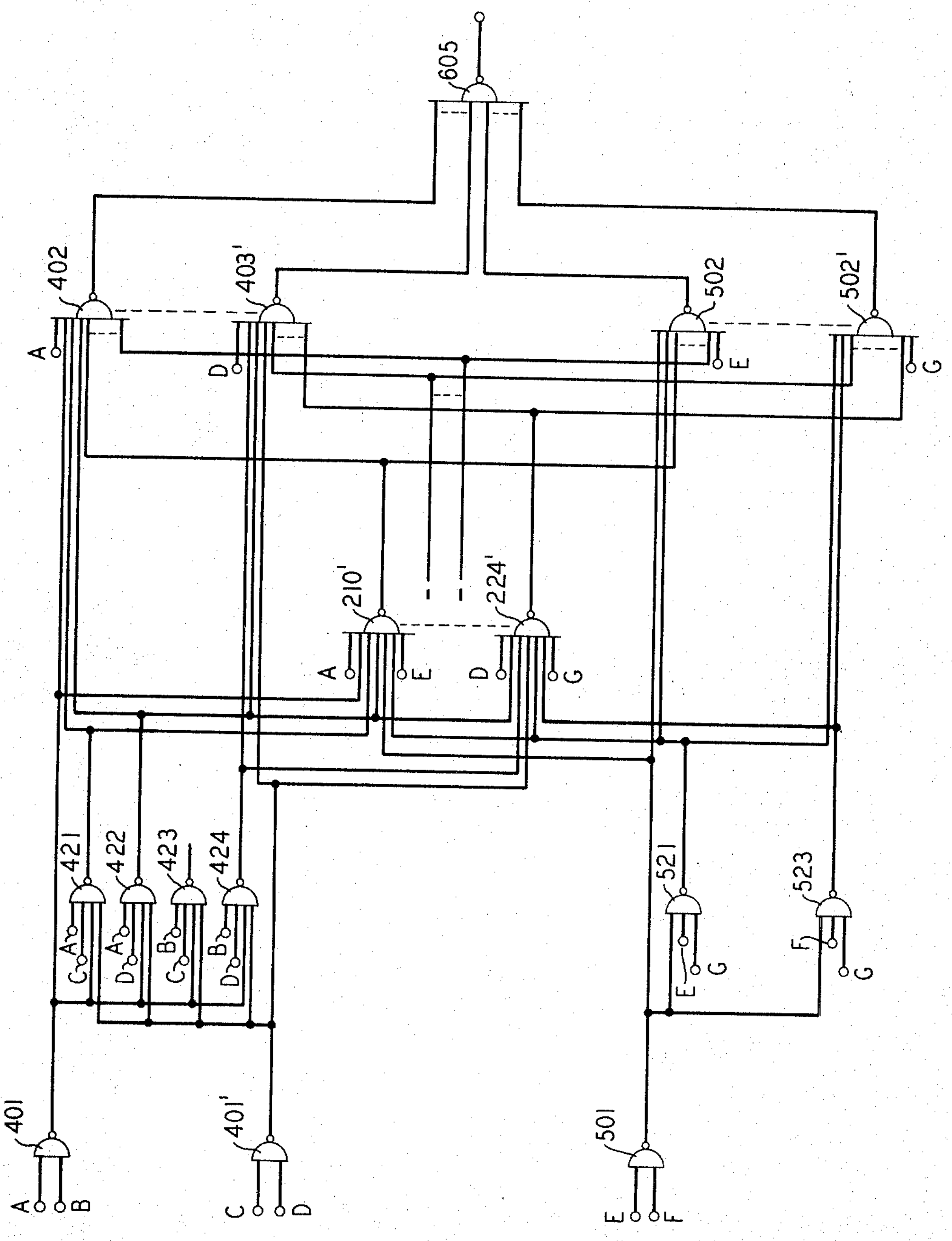
FIG. 6 shows a new 7-input, parity checking circuit obtained from an 8-input circuit according to the reduction procedure.

An example of a 7-input circuit is shown in FIG. 6. The 7-input circuit is obtained by applying the reduction procedure once to an 8-input circuit like that shown in FIG. 5. According to the reduction procedure, gates 213, 217, 221, 225, 101', 102', 122 and 124 and their corresponding leads are eliminated from the 8-input circuit to form the 7-input circuit. All of the rest of the NAND gates of an 8-input circuit remain in the 7-input circuit. However, all of the remaining NAND gates have reduced fan-in or fan-out requirements. The reference characters of the remaining gates have been changed in FIG. 6 to indicate these differences.

As is apparent from FIG. 6 and from Formulae b–f, the 7-input circuit has twenty-nine NAND gates organized into five levels of logic. The maximum fan-in requirement is seven, occurring at output gate 605, and the maximum fan-out requirement is twelve, occurring at primary input gates 401, 401', and 501.

$k$-input, parity checking circuits derived according to the above procedures can be expanded to have $k=n$ inputs to realize any $n$ variable, Boolean, parity function. Furthermore, in cases where $n$ is a particularly large number, it is often advantageous to apply $k$-input, parity checking circuits as the individual elements in a parity tree structure. For instance, this may be true in cases where $n$ is much larger than $k$ and standard $k$-input circuits are readily available for incorporation into a parity tree structure.

For certain selected values of $k$, parity tree structures comprised of $k$-input circuits have a potential operating speed which is up to three times faster than the operating speed of a corresponding $n$-input parity tree comprised of a plurality of the prior art, 2-input, Exclusive-OR circuit 10 shown in FIG. 1. Unfortunately this higher potential operating speed is achieved at the expense of a larger logic gate requirement. However, for other selected values of $k$ parity tree structures comprised of the $k$-input circuits are achieved which are both faster and more economical in terms of logic levels and logic gate requirements than the conventional parity tree.

FIG. 7 shows a table illustrating both the advantages and disadvantages of the use of the $k$-input circuit in a parity tree. The table depicts the total number of NAND gates $G_k$ and the total number of logic levels $L_k$ required and disadvantages of the use of the $k$-input circuit in a for various values of $k$.

The formulae used for generating the table shown in FIG. 7 are:

(g) $$G_k=g\left[\frac{n-2}{k-1}\right]+g, \text{ and}$$

(h) $$L_k=[\log_k(n-1)]+1$$

in combination with, (i) $$g=\frac{k(k+1)}{2}+1, \text{ and}$$

(j) $$=[\log_2(k-1)]+3$$

Again the brackets connote the integral value of the quantity enclosed therein.

Formula i is merely a repeat of Formula c used previously to calculate the number of NAND gates in a $k$-input circuit. Formulae g which incorporates Formula i within it, represents the total number of NAND gates required to implement an $n$-input parity tree structure comprised of the $k$-input modules.

Similarly, Formula j is merely a repeat of Formula d used above to calculate the number of levels of NAND gate logic required to implement a $k$-input circuit. Formula h, which depends upon Formula j, represents the number of levels of NAND gate logic required to implement an $n$-input parity tree with $k$-input circuits.

It should be apparent from the prior description of the table that the entries in bold print in the leftmost column of the table for $k=2$ represent the conventional realization of a parity tree with a plurality of the prior art, 2-input, Exclusive-OR, parity checking circuit 10. It is further apparent from the table that for particular values of $k$ and $n$ parity trees formed of the $k$-input circuits can be implemented which have both fewer logic gates and fewer logic levels than the conventional parity trees represented in the leftmost column of the table.

For any given value of $n$, parity trees utilizing the 3-input and the 4-input circuits are often less expensive in terms of logic gates and faster in terms of logic levels than the conventional parity tree utilizing 2-input circuits.

It can also be seen from the table that an input parity tree formed of the $k$-input circuits where $k$ is relatively large number, although still less than $n$, is faster than a parity tree comprised of $k$-input circuits where $k$ is relatively low number compared to $n$. In the limit where $k=n$, a parity tree comprising a single $k$-input circuit is the fastest parity checking circuit that can be implemented according to these procedures. Of course, such a parity tree is actually nothing more than a $k$-input, parity checking circuit.

The NAND gate requirements and the number of logic levels required to implement such a parity are shown in bold print along the main diagonal of the table. It is apparent from the table, however, that this type of pariy tree is the most expensive in terms of the number of NAND gates required to implement it.

Thus, in short, a logic designer may choose any compromise he wishes between the economy of the conventional tree technique and the speed of the $k$-input circuit technique. In addition, for particular values of $k$ and $n$ the designer can achieve various mixtures of the advantages of both technques.

What is claimed is:

1. A parallel parity checking circuit comprising NAND logic gates and having $k$ primary binary inputs, where $k$ may be any integral number greater than three, including:

- a pair of parallel, $2^r$-input, parity checking circuits having at least $r$ levels of NAND gate logic, where $r$ is the largest integral number less than or equal to $\log_2 k$;
- means for coupling predetermined primary inputs to selected NAND gates in the level $r$ of logic of said $2^r$-input circuits;
- an output NAND gate, the inputs of which are connected to the outputs of the NAND gates in the level $r$ of logic of $2^r$-input circuits;
- interactive logic comprising a plurality of NAND gates for cross-coupling said $2^r$-input parity checking circuits;
- means for coupling a different pair of the $k$ primary inputs to the inputs of each of those NAND gates comprising said interactive logic; and
- means for coupling the outputs of those NAND gates comprising said interactive logic to the inputs of those NAND gates in the level $r$ of logic of said $2^r$-input circuits which have common primary inputs.

2. The $k$-input parity checking circuit in accordance with claim 1 having a maximum of $(r+2)$ levels of NAND gate logic.

3. The $k$-input parity checking circuit in accordance with claim 2 having a maximum of $$\frac{k(k+1)}{2}+1$$

NAND gates.

4. The $k$-input parity checking circuit in accordance with claim 3 in which said interactive logic comprises up to $(2^{r-1})^2$ NAND gates.

5. A parallel input, parity checking circuit having an arbitrary integral number of primary binary inputs greater than three, including:

- first and second multi-input parity checking circuits having at least $r$ levels of NAND gate logic;
- means for coupling predetermined ones of the primary inputs to selected NAND gates in the level $r$ of logic of both of said first and second parity checking circuits; and
- interactive logic comprising a plurality of NAND gates for interactively cross-coupling the outputs of NAND gates in the level $(r-1)$ of logic in said first and second circuits with the level $r$ of logic in both of said first and second circuits.

6. A parallel input parity checking circuit having an arbitrary integral number of primary binary inputs greater than three, including:

- at least two multi-input parity checking circuits, each having at least $r$ levels of NAND-gate logic; and
- interactive logic comprising a plurality of NAND gates for cross-coupling said multi-input circuits, a different pair of said primary inputs being coupled to the input of each of such NAND gates and the outputs of such NAND gates being connected to the inputs of those NAND gates in the level $r$ of logic of said multi-input circuits which have common primary inputs.

7. The parity checking circuit in accordance with claim 6 in which

- said interactive logic including means for providing NAND functions of pairs of otherwise uncombined primary inputs and outputs of NAND gates located in the level $(r-1)$ of logic of said multi-input circuits.

8. The parity checking circuit in accordance with claim 6 in which

- said multi-input parity checking circuits each include three levels of NAND gate logic, the first level of logic including a first NAND gate, the second level of logic including second and third NAND gates, and the third level of logic including a fourth NAND gate;
- an output from said first NAND gate connects to one of the inputs on each of said second and said third NAND gates;
- outputs of said second and said third NAND gates each respectively connect to a different one of the inputs on said fourth NAND gate;
- a first input to said first NAND gate connects to an input to said second NAND gate; and
- a second input to said first NAND gate connects to an input to said third NAND gate.

9. A method for realizing a parity checking function of $2^r$ different, primary, binary inputs which employs a pair of $2^{r-1}$-bit, parallel input, all-NAND-gate, parity checking circuits, each of said circuits performing a parity check over $2^{r-1}$ different ones of said $2^r$ primary binary inputs, and each of said circuits comprising $(r+1)$ levels of logic, as measured from the level of logic accepting only primary binary inputs, said method including the steps of:

(a) generating a NAND function of each pair of said $2^r$ primary inputs, which are not coincidentally combined as such in one of the NAND gates of either of said circuits, and of the output of each NAND gate in the first $(r-1)$ levels of logic in each of said circuits that has as a primary input one of said pairs of primary inputs;

(b) applying each such NAND function to an input of every NAND gate in level $r$ of logic in each of said circuits which has as a primary input one of said pair of primary inputs directly used to generate such function; and (c) generating a single NAND function of the outputs of all of said NAND gates located in the level $r$ of logic of said circuits.

10. A method in accordance with claim 9 for realizing a parity checking function of an arbitrary number $k$ of different, primary, binary inputs, where $k$ is less than $2^r$ and greater than $2^{r-1}$, including the steps of:

(a) selecting $2^r-k$) ones of said $w^r$ primary binary inputs to be logical "zeros"; and (b) generating only those of said NAND functions and including only those of said NAND gates whose outputs may attain a logical state other than a logical "one," according to the rules of Boolean logic.

References Cited

UNITED STATES PATENTS 3,136,901 6/1964 Yen ---------- 340—146.1 AG

OTHER REFERENCES

Sellers et al.: Error Detecting Logic for Digital Computers, McGraw-Hill Co., 1968, pp. 59–65.

CHARLES E. ATKINSON, Primary Examiner